Sept. 6, 1955        P. A. STREICH ET AL        2,716,776
SHRIMP PROCESSING APPARATUS
Filed Jan. 11, 1952        8 Sheets-Sheet 3

INVENTORS:
Philip A. Streich,
Emmitte P. Tait & Virgil R. Clark;
BY
Paul & Paul
ATTORNEYS.

Sept. 6, 1955  P. A. STREICH ET AL  2,716,776
SHRIMP PROCESSING APPARATUS
Filed Jan. 11, 1952  8 Sheets-Sheet 5

FIG_5_

FIG_6_

INVENTORS:
Philip A. Streich,
Emmitte P. Tait & Virgil R. Clark,
BY Paul & Paul
ATTORNEYS.

Sept. 6, 1955  P. A. STREICH ET AL  2,716,776
SHRIMP PROCESSING APPARATUS
Filed Jan. 11, 1952  8 Sheets-Sheet 7

FIG_8_

FIG_12_

INVENTORS:
Philip A. Streich,
Emmitte P. Tait & Virgil R. Clark,
BY
Paul & Paul
ATTORNEYS.

United States Patent Office 2,716,776
Patented Sept. 6, 1955

2,716,776

SHRIMP PROCESSING APPARATUS

Philip A. Streich, Philadelphia, Pa., and Virgil R. Clark, Decatur, and Emmitte P. Tait, Chamblee, Ga., assignors to Tait-Clark-Streich Machinery Corp., Decatur, Ga., a corporation of Georgia Application January 11, 1952, Serial No. 265,976

10 Claims. (Cl. 17—2)

This invention relates to an apparatus and method for processing shrimp, and further relates to an edible shrimp segment comprising a product of said apparatus and method. More particularly the invention concerns the continuous automatic processing of natural shrimp wherein the body shells, legs, and vein of the shrimp are removed therefrom. In accordance with one aspect of the invention, the tail of the shrimp is also removed along with the elements previously mentioned.

Considerable difficulty has been encountered in the shrimp processing art in connection with the preparation of a commercially acceptable cleaned shrimp product. Machines previously provided for this purpose have not been completely successful because of their inability to produce a thoroughly cleaned product continuously and rapidly. For this reason the bulk of the shrimp has heretofore been processed manually. This not only involves high labor charges which are reflected in an increased cost of the shrimp product, but also involves serious losses due to shrimp spoilage in the event that the required labor forces are not available at the time the shrimp catch is brought ashore. Moreover manual cleaning of shrimp is slow and results in deterioration which causes loss of flavor, tenderness and freshness. Shrimp should be refrigerated or frozen soon after it is caught. The longer the time delay in cleaning and de-shelling, the more inferior the product.

It is accordingly an object of this invention to provide a continuous automatic apparatus for processing shrimp. Another object is to provide a high capacity, high speed machine for continuously de-shelling and de-veining shrimp.

Shrimp products of several different kinds are currently in commercial demand. For certain purposes it is desired to produce a completely de-shelled, de-veined, de-legged and de-tailed shrimp product. For other purposes it is highly desirable to remove the veins and legs from the shrimp body and cut a slot lengthwise of its shell while leaving the majority of the shell intact. Such shrimp can be used after cooking for salads, cocktail uses, and otherwise. The shell protects the shrimp meat against spoilage but is easy to remove if desired. On the other hand there is also a great commercial demand for the so-called fantail shrimp which is completely cleaned and has the legs and body shells removed therefrom, but has the shrimp tail and tail shell attached thereto. It is accordingly another object of our invention to provide a machine which has capacity to manufacture shrimp products of these different kinds. In this connection it is another object to provide a machine which is readily converted from the production of one kind of shrimp product to another. It is a still further object to produce a novel and useful fantail shrimp product. It is still a further object to produce a novel and useful shrimp product with the legs and veins removed and the shell intact.

The automatic processing of shrimp presents a particularly difficult problem in view of the fact that the size and shape of raw shrimp varies from one shrimp to another. It is accordingly still another object of this invention to provide a machine of the foregoing character which is self-adjustable to accommodate automatically shrimp of different sizes and shapes.

Another difficulty encountered in automatic shrimp handling operations results from the fact that the shrimp body has a natural tendency to curl and is difficult to maintain in a straightened-out position. Accordingly it is a still further object of this invention to provide an automatic shrimp handling machine including means for maintaining each shrimp substantially straight or uncurled.

In our co-pending application which bears Serial No. 224,712, filed May 1951, now Patent No. 2,685,705 of which this application is an improvement, we disclose a shrimp processing machine of a reciprocating type which has many inherent advantages as pointed out in the aforesaid pending application. However, other advantages are attained by providing a machine wherein each shrimp is moved continuously in the same direction, and the attainment of this end constitutes another object of this invention.

It is still another object of this invention to provide an automatic high speed shrimp processing machine which cleans the shrimp but does not injure the edible portion of the shrimp body to any appreciable extent. Another object is to provide a machine of this character which is extremely compact and readily portable and therefore adapted to be carried in confined places such as the deck of a shrimp boat, for example. Yet another object is to provide a shrimp processing machine including a plurality of separate processing elements, the operation of each of which is synchronized with the movement of the shrimp through the machine, whereby the shrimp is automatically processed as it advances continuously through the machine.

Other objects and advantages of the invention, including the simplicity and economy of the same, and the ease with which it may be carried into effect, will become further apparent hereinafter.

Figure 1:
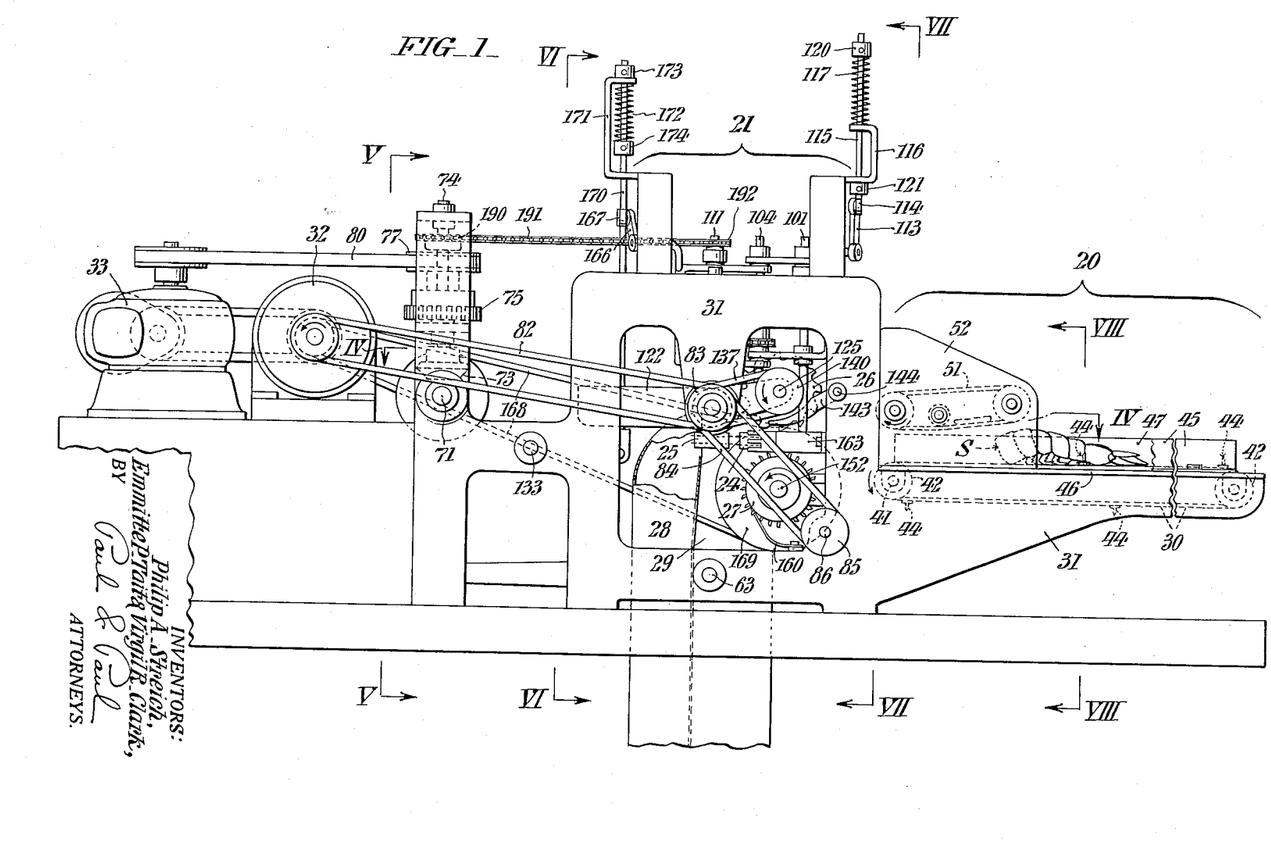
Fig. 1 represents a side elevation of a machine constituting one specific embodiment of this invention, with certain parts broken away and others shown in section in order more clearly to illustrate important details.
Figure 2:
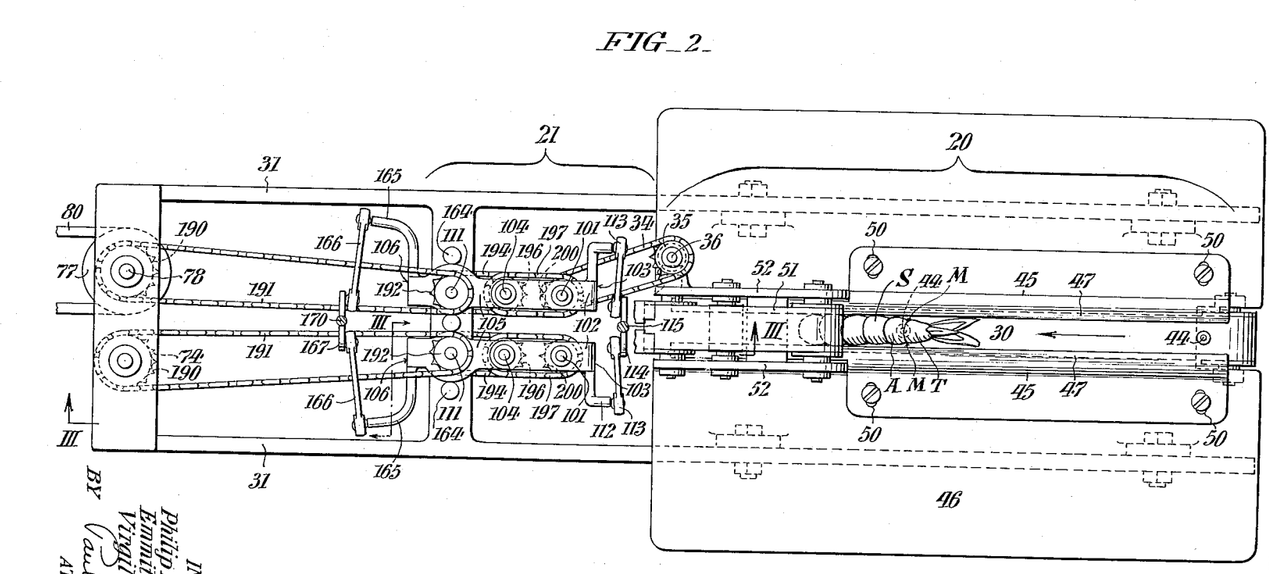
Fig. 2 represents a plan view of the apparatus illustrated in Fig. 1, certain parts being shown in section in order more clearly to illustrate portions of the drive means of the apparatus.

Turning now to the specific embodiment of the invention illustrated in the drawings, the number 20 designates comprehensively a feed conveyor means at the front of the machine which serves to feed the shrimp S in a rearward direction into the machine, while the number 21 designates the shrimp processing portion of the machine wherein sets of transverse tailsaws 22, forward feed rolls 23, de-sheller wheels 24 and rear feed rolls 25 contact the shrimp S in predetermined timed relationship to advance the shrimp S rearwardly through the machine and remove either selected shell portions, or all of the shell, therefrom. Also in the shrimp processing portion 21 of the machine, a de-veiner saw 26 penetrates the top of the shrimp S to remove the top vein therefrom and a de-legger element 27 contacts the bottom of the shrimp S to remove the bottom vein and the legs of the shrimp S therefrom. Cam means are included for activating and inactivating the transverse tailsaws 22, the de-sheller wheels 24 and the de-veiner saw 26 in predetermined timed relationship relative to the advancement of the shrimp S through the machine, as will appear in further detail hereinafter. A shrimp storage bin 28 (Fig. 1) having a shells collection compartment 29 is fixed on the machine frame.

Figure 8:
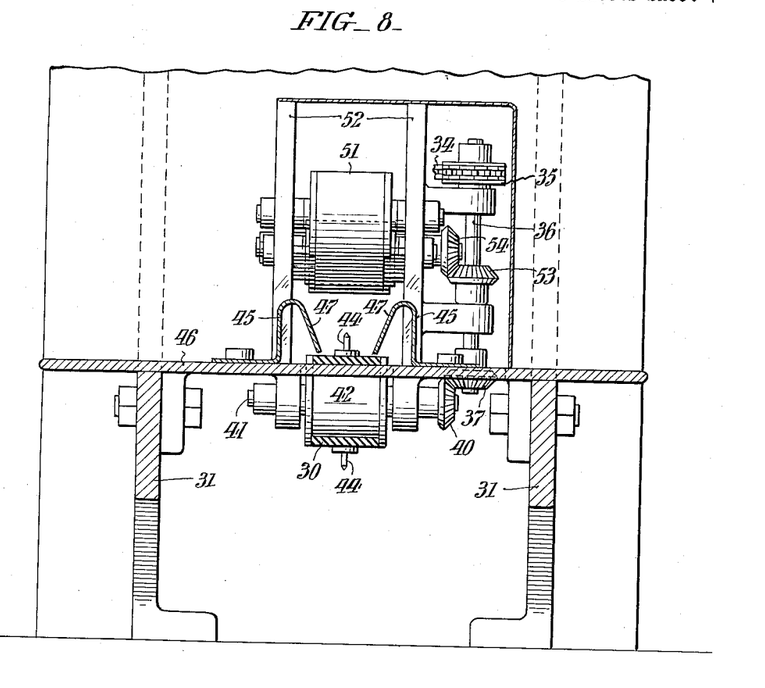

The feed conveyor means comprehensively designated 20 includes an endless main conveyor belt 30 mounted on a machine frame 31. The main conveyor belt 30 is driven from motor 32 and reduction gear 33 through a positive chain drive linkage further to be described which is connected to drive a drive chain 34, sprocket 35, vertical shaft 36 and bevel gears 37, 40 (see Figs. 3 and 8). Bevel gear 40 is affixed to the transverse shaft 41 of conveyor pulley 42 around which the endless conveyor belt 30 is trained. Extending normally from spaced-apart points on the endless conveyor belt 30 are a plurality of sharp pins 44 which serve as shrimp mounting pins. The movement of each pin 44 is timed relative to the movements of other parts of the machine, as will appear in further detail hereinafter.

Shrimp centering plates 45 are mounted on a floor plate 46 on opposite sides of the endless conveyor belt 30. Each centering plate 45 extends longitudinally of the endless conveyor belt 30 and includes an inclined portion 47 which is inclined upwardly away from the longitudinal center of endless conveyor belt 30. The centering plates 45 are slotted at 50 and are adjustable toward and away from one another on the floor plate 46 for engaging the opposite sides of the body of each shrimp S and centering it as it moves rearwardly with the conveyor belt 30.

An inclined conveyor belt 51 is trained around shafts and pulleys rotatably mounted on the frame portions 52. The conveyor belt 51 is inclined downwardly from the front toward the rear, and is driven from the vertical shaft 36 through bevel gears 53, 54. It serves to compress and flatten each shrimp S against the main conveyor belt 30 and the centering plates 45.

Extending transversely of the frame 31 immediately rearwardly of the rear end of conveyor belt 30 is a transfer plate 55 (see Fig. 3) which is disposed at the level of the upper flight of conveyor belt 30. The forward feed rolls 23 engage upon the leading end of the shrimp S as it is discharged by the conveyor belt 30 and coact with the sharp pin 44 to move the shrimp S in a rearward direction across the transfer plate 55.

Figure 3:
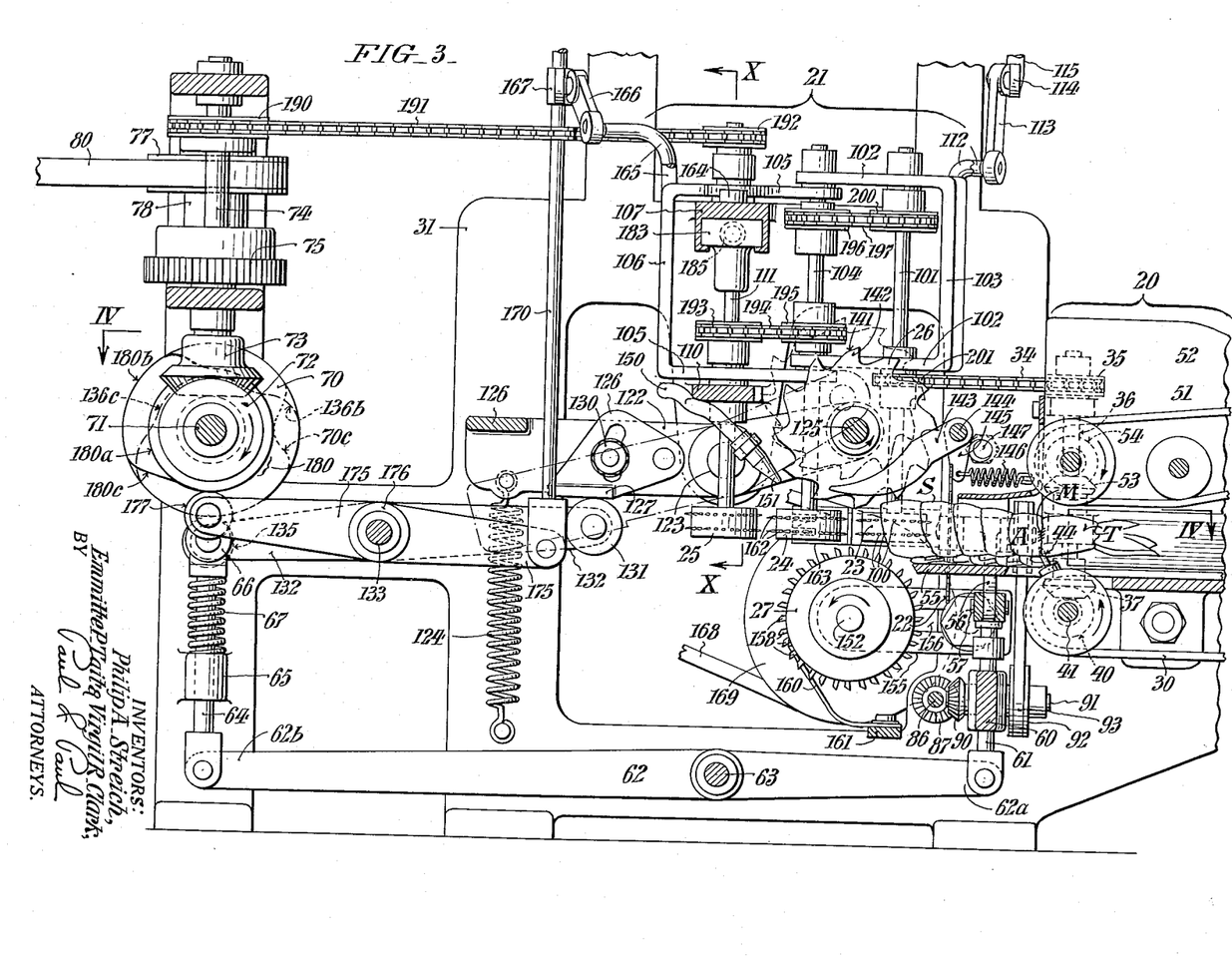
Fig. 3 represents an enlarged longitudinal sectional view of the central portion of the machine, taken as indicated by the lines and arrows III—III which appear in Figs. 2 and 4.
Figure 7:
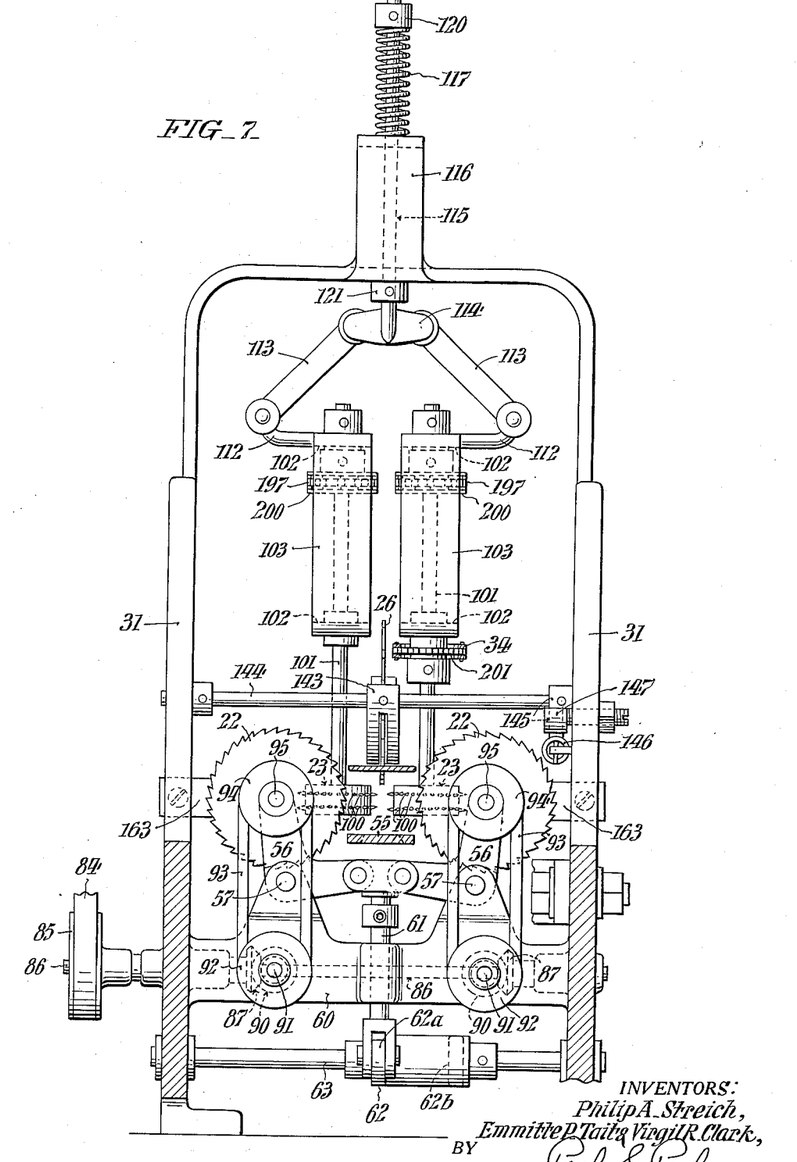

The tailsaws 22 are mounted with capacity to move transversely toward and away from the shrimp in predetermined relation to the movement of the shrimp S across the transfer plate 55. Each tailsaw 22 thereby cuts off the muscles M at each side of the shrimp S which join the shell section T at the tail of the shrimp to the adjacent shell section A. As indicated in Figs. 3 and 7, each transverse tailsaw 22 is rotatably mounted on one arm of a bell crank lever 56 pivoted at 57 to a transverse frame member 60. Pivoted to the other arm of each bell crank lever 56 is a vertically reciprocable rod 61 linked to the front end 62a of rocker arm 62. Rocker arm 62 is pivoted at 63 to the frame and linked at its rear end 62b to a rod 64 vertically reciprocable in a sleeve 65 fixed to the machine frame. A roller 66 is rotatably mounted on top of rod 64 and spring urged by spring 67 against the surface of a tailsaw cam 70 which is fixed on a transverse cam shaft 71. The tailsaw cam 70 has one inactive cam track 70a which is substantially cylindrical and an adjacent, active cam track 70b which is generally cylindrical but has an indentation 70c, see Fig. 3, which actuates the rocker arm 62 and moves the tailsaws 22 toward and away from one another. The cam shaft 71 is driven from a master drive shaft 78 through bevel gears 72, 73, shaft 74, and gears 75, 76. Pulley 77 and belt 80 drive the master drive shaft 78 from the reduction gear 33. Tailsaw cam 70 is adjustable by means of set screw 81 longitudinally of the shaft 71 to effect the selective alignment of either the active cam track 70b or the inactive cam track 70a with the roller 66.

Drive means are also provided for rotating each tailsaw 22 continuously at high speed about its axis. This means includes (see Figs. 4 and 7) the belt 82 driven directly from motor 32, pulley 83, belt 84, pulley 85, shaft 86, and bevel gears 87 and 90. The bevel gear 90 is mounted on a shaft 91, see Fig. 7, which carries a pulley 92 around which is trained a drive belt 93. Drive belt 93 is also trained around a pulley 94 mounted on a shaft 95 which carries the tailsaw 22.

Each of the forward feed rolls 23 has two sets of radially disposed teeth 100, one set above the other, for engaging and gripping the sides of each shrimp S as it is discharged from the conveyor belt 30. Each forward feed roll 23 is mounted on a rotatable shaft 101 which is mounted in bearings in the spaced horizontal arms 102 of a bracket member 103, see particularly Fig. 3. At its free end each arm 102 has an aperture through which a rotatable de-sheller shaft 104 extends. Each de-sheller shaft 104 is also disposed through aligned apertures in the ends of horizontal arms 105 of a yoke 106. Each yoke 106 is pivotally mounted on a pair of transverse frame members 107, 110 with a rear feed roll shaft 111 vertically and rotatably disposed through said horizontal arms 105 and said transverse frame members 107, 110.

Equalizer means are provided for urging the forward feed rolls 23 through equal distances yieldably toward and away from one another for effecting engagement with shrimp S of variable sizes. As appears in more particular detail in Figs. 1, 3 and 7, a rigid bar 112 is affixed to the upper corner of each of the bracket members 103 and pivoted to a link bar 113 which is pivoted at its upper end to a cross head 114. Each cross head 114 is fixed on the end of a vertically reciprocable rod 115 disposed through spaced apertures in the U-frame 116. A spring 117, normally under compression, bears against the top leg of U-frame 116 and against an upper collar 120 fixed on the vertically reciprocable rod 115. A lower collar 121 on rod 115 limits the upward movement of rod 115 relative to U-frame 116. It will accordingly be apparent that the spring 117, acting through the linkage just described, continuously urges the vertical arms of the bracket members 103 to swing yieldably toward one another about the axes of the de-sheller shafts 104, and the forward feed rolls 23 are correspondingly spring-urged toward one another for positive yieldable engagement with each shrimp S. The linkage members of the apparatus assure that each movement of each forward feed roll 23 is exactly duplicated by a corresponding movement of the other forward feed roll 23.

Means are provided for removing from the shrimp S the upper vein which extends along the top of the shrimp body. The de-veiner saw 26 is rotatably mounted on a saw shaft 125 which bridges across the forward ends of the lever arms 122 which are pivoted on bearings 123 to both sides of the frame of the machine. A cross brace 126 connects the rear ends of the arms 122 together. Attached to the rear end of one arm 122 is a spring 124 which is also attached to the machine frame and serves to urge the de-veiner saw 26 upwardly away from the shrimp S.

Means are provided for moving the de-veiner saw 26 downwardly and upwardly in predetermined timed relation to the movement of the shrimp S to effect selective engagement upon and disengagement from said shrimp. A slotted plate 126 having an integral wing 127 is adjustably secured on one arm 122 by means of a nut 130. A roller 131 rotatably mounted on the forward end of a rocker arm 132 is continuously in contact with the bottom of wing 127. The rocker arm 132 is pivoted on rock shaft 133 by bearing 134. Rotatably mounted on the rear end of rock shaft 132 is a cam follower roller 135 which is actuated by a de-veiner cam 136 fixed on the cam shaft 71. The de-veiner cam 136 has a substantially cylindrical inactive track 136a and an active track 136b which includes an indentation 136c which permits the de-veiner saw 26 to rise under the influence of spring 124 to the inoperative position shown in dotted lines in Fig. 3 of the drawings. De-veiner cam 136 is adjustable along the cam shaft 71 in the same manner as previously described in connection with tail-saw cam 70.

The de-veiner saw 26 is rotated at high speed from the motor 32 by a direct drive which includes the belt 82, pulley 83, belt 137 and pulley 140 which is affixed on the saw shaft 125. The de-veiner saw 26 preferably revolves at about 1700 revolutions per minute, in a direction countercurrent to the movement of the shrimp S as indicated by the arrow thereon in Fig. 3. The forward edges 141 of blades 142 are sharp and inclined at a relatively small angle with respect to the horizontal as they come into contact with the top of the shrimp body; thereby tearing of the shrimp is minimized as the upper vein is removed and a clearly defined channel is cut into the top of the shrimp. Moreover the inclination and upward movement of the saw blades 142 coact to provide a lifting effect on the shrimp body and thereby counteract the normal tendency of the shrimp to curl. The shrimp S would otherwise tend to travel in a curved path downwardly as it advanced through the machine. It will be appreciated, however, that in many cases effective de-veining may be obtained by revolving the de-veiner saw 26 in the opposite direction.

A spacer fork 143 is pivotally mounted on a shaft 144 fixed on the frame, and is disposed immediately adjacent both sides of the de-veiner saw 26. An arm 145, fixed on shaft 144, is spring-urged by spring 146 against the adjustable eccentric stop 147. The spacer fork 143 controls the depth of cut of the de-veiner saw into the shrimp and also has a curved bottom edge which serves as a deflector for the veins as they are removed from the shrimp. The spacer fork 143 is not intended to contact the body of the shrimp S unless the shrimp body should rise considerably above its intended path, in which event the fork 143 guides the shrimp downwardly toward the de-sheller wheels 24.

The de-veining action of the de-veiner saw 26 is complemented by the action of a fluid conduit 150 and spray nozzle 151 thereon, which direct a stream of water or other fluid under high pressure against the top of the shrimp body. While the fluid stream is primarily directed upon the channel created by the de-veiner saw 26 in the shrimp body, it also serves to clean the de-veiner saw as well as other adjacent parts of the machine.

Figure 4:
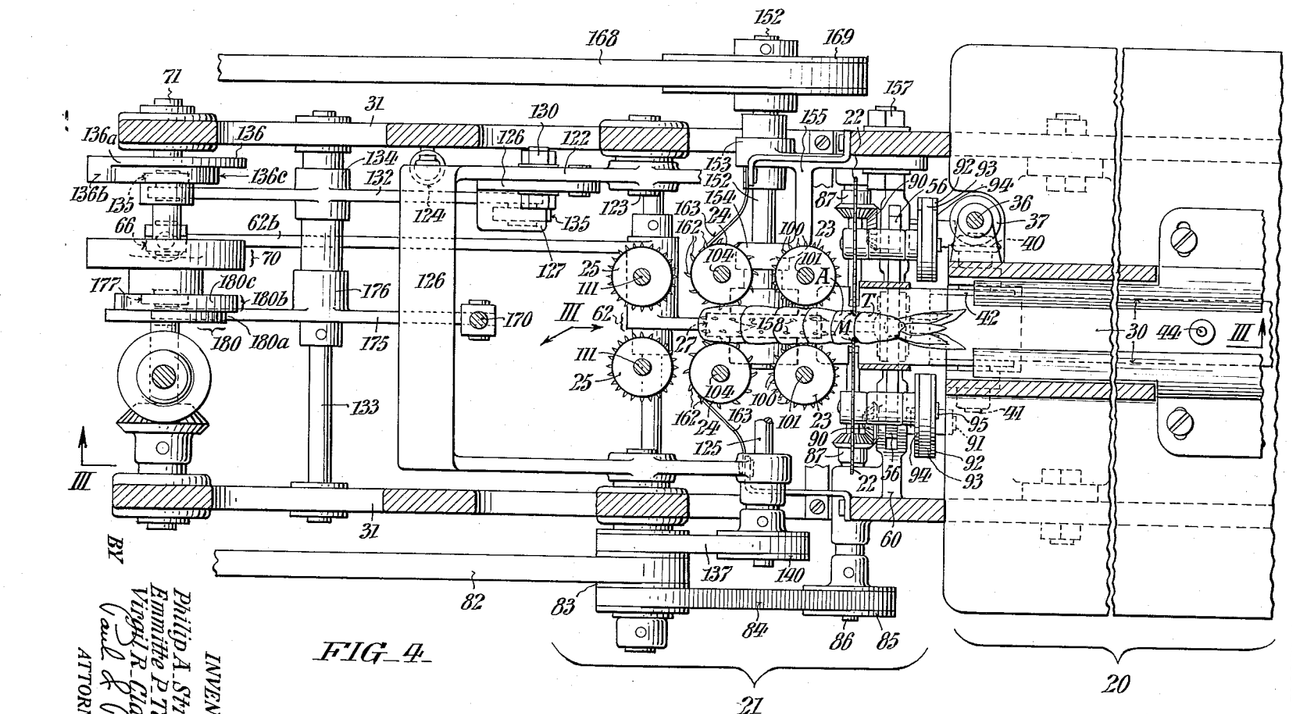
Fig. 4 represents a sectional view in plan taken as indicated by the lines and arrows IV—IV which appear in Figs. 1 and 3.

The de-legger element 27 is mounted on a de-legger shaft 152 which is mounted for rotation in bearings 153, 154 (Fig. 4). Bearings 153 and 154 are mounted on a bracket 155 which has a longitudinal slot 156 (Fig. 3) and is adjustably secured to the frame of the machine by a nut 157. The de-legger wheel 27 has two peripheral rows of spikes 158 which remove the blood vein from the bottom of the shrimp as well as the membrane which secures the legs to the shrimp body. A scraper blade 160 is mounted on a cross bar 161 and has its free end disposed against the periphery of the de-legger wheel between the spikes 158 and thereby serves continuously to remove and discard the legs and other parts as they are stripped from the spikes 158.

Preferably the de-legger wheel 27 is located directly below the bottom of the de-veiner saw 26, rearwardly of the forward feed rolls 23 and forwardly of the de-sheller wheels 24.

The de-legger element 27 is driven from the motor 32 at a reduced speed (preferably about one-third the speed of rotation of the de-veiner saw 26) by a drive connection including the de-legger belt 168 and pulley 169 which is fixed on the shaft 152.

Figure 9:
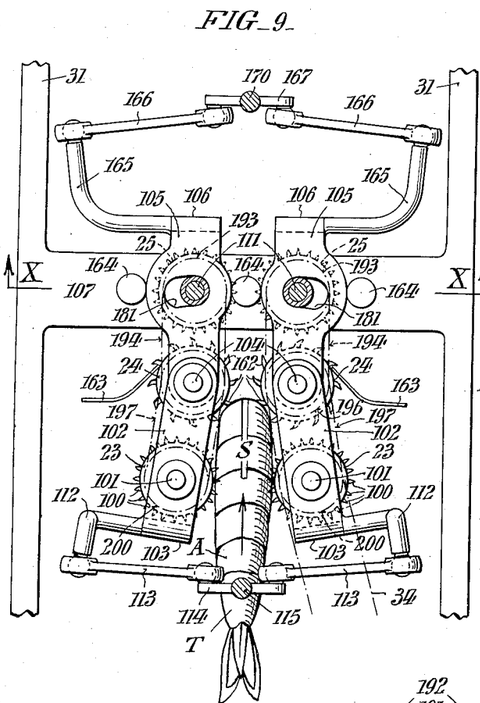
Fig. 9 represents an enlarged sectional view in plan showing the operation of certain of the shrimp processing elements of the apparatus during one stage of the operation, taken as indicated by the lines and arrows IX—IX which appear in Fig. 10.

The de-sheller wheels 24 are mounted on the de-sheller shafts 104 rearwardly of the forward feed rolls 23 and at a common level therewith, and rearwardly of the de-veiner saw 26 and de-legger element 27. The de-sheller wheels 24 have two peripheral rows of non-radial hook members 162. The hook members 162 are inclined forwardly as they engage the shrimp S (see particularly Fig. 9). The hook members 162 travel at a slightly greater peripheral speed than the pins on the forward feed rolls 23 since the diameters of the hook members 162, as mounted on the de-sheller wheels 24, are slightly greater than the diameters of the pins on the forward feed rolls 23. The hook members 162 penetrate through the shells of the body portion of the shrimp S and, as they continue to rotate, strip the shells from the shrimp. This stripping action is facilitated by the longitudinal slot previously cut through the top of the shell by the de-veiner saw 26. A doctor blade 163 is disposed immediately adjacent the periphery of each de-sheller wheel 24 and serves to scrape the shells therefrom. The doctor blades 163 are mounted on the frame of the machine immediately above the shells collection bin 29, see Fig. 1, into which the shells fall from the doctor blades 163.

Figure 5:
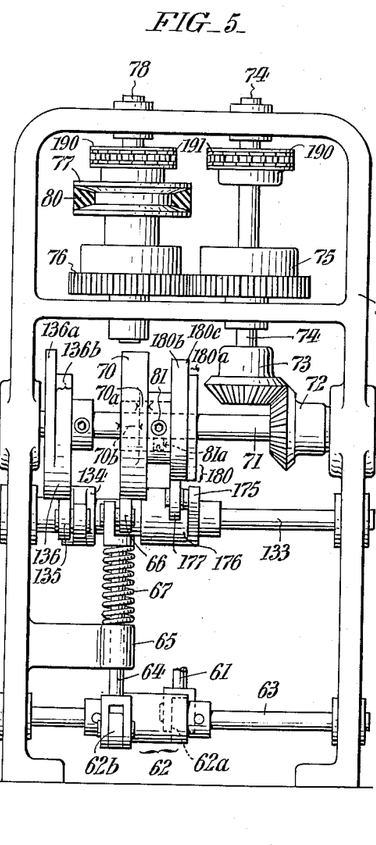
Figs. 5, 6, 7 and 8 represent enlarged sectional views taken as indicated by the lines and arrows V—V, VI—VI, VII—VII and VIII—VIII respectively, which appear in Fig. 1.
Figure 6:
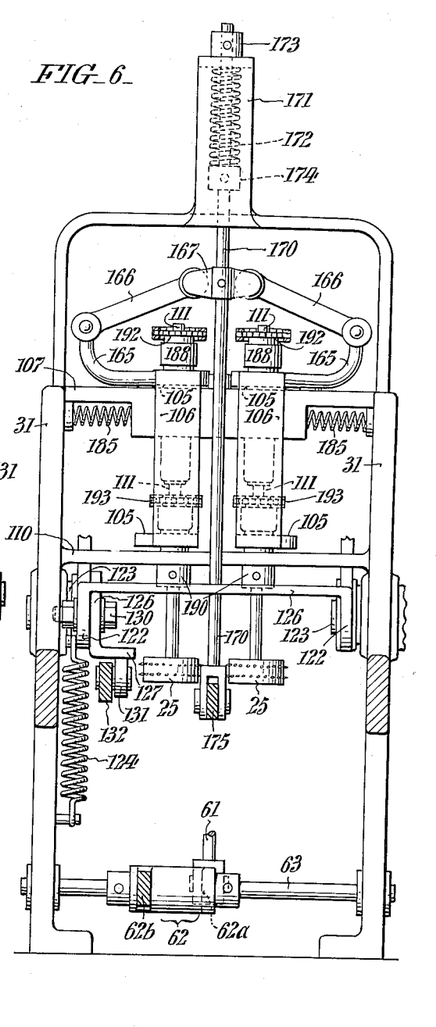
Figure 10:
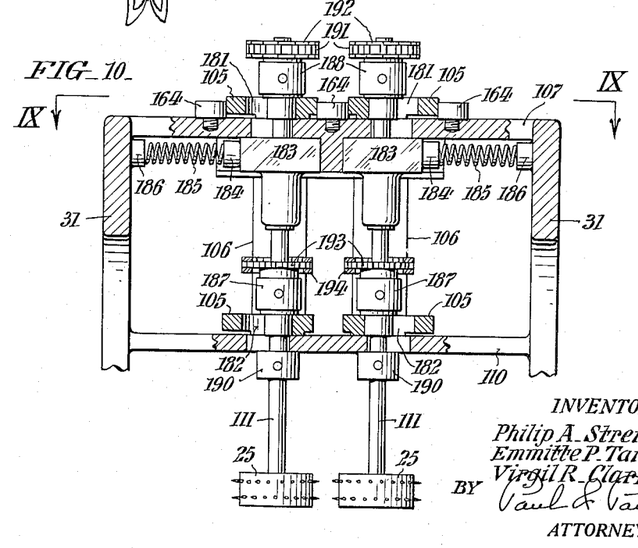
Fig. 10 represents an enlarged sectional view taken substantially as indicated by the lines and arrows X—X which appear in Figs. 3 and 9.

Means are provided for moving the de-sheller wheels 24 inwardly and outwardly toward and away from the shrimp S in predetermined timed relation to the movement of the shrimp in the machine. Referring particularly to Figs. 3, 6 and 10 of the drawings, it will be recalled that the yoke 106 is pivotally mounted on the transverse frame member 107. It has capacity to rotate about the pivot defined by a plurality of screw heads 164. An equalizer device (Fig. 6) including rigid bars 165, link bars 166, cross head 167, vertically reciprocable rod 170, U-frame 171, spring 172, upper collar 173 and lower collar 174 serves to swing the horizontal arms of yoke 106 about their pivot points. Such equalizer device has a construction and operation similar to the members 112—117, 120, 121 previously described in further detail herein. The vertically reciprocable rod 170 is linked to a de-sheller rocker arm 175 which is pivotally mounted in bearing 176 on rock shaft 133 and carries a cam follower roller 177 normally urged against a de-sheller cam 180 by the action of the spring 172. De-sheller cam 180 is fixed on the cam shaft 71 and has an inactive track 180a and an active track 180b which includes a cylindrical portion and a projection 180c which permits the roller 177 to move downwardly under the influence of spring 172 to depress the link bars 166 and separate the de-sheller wheels 24 from one another, moving them through equal distances away from the sides of the shrimp. The de-sheller cam 180 is adjustable as a separate unit on cam shaft 71 by set screw 81a indicated in Fig. 5. The tailsaw cam 70 is adjustable around the hub of 180 when the set screw 81 is loose, and these two cams 70, 180 are thereby selectively rendered either active or inactive as a unit.

Figure 11:
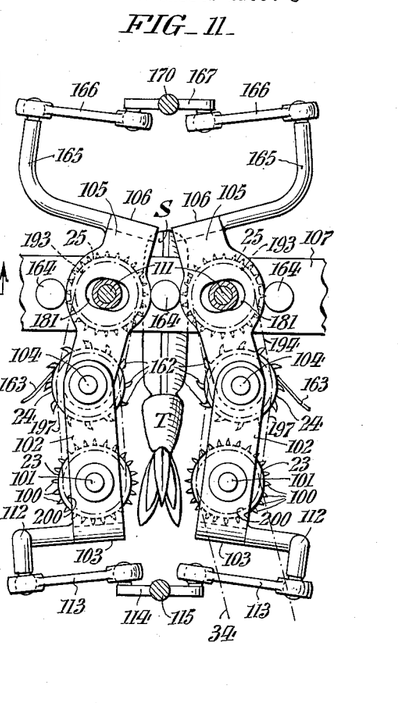
Fig. 11 represents an enlarged sectional view in plan similar to Fig. 9, showing the positions assumed by the shrimp processing elements at another stage of the operation.

The upper and lower horizontal arms 105 of each yoke 106 have slots 181, 182 (see particularly Figs. 9–11) through which each rear feed roll shaft 111 extends. The transverse frame members 107 and 110 are correspondingly slotted to permit movement of the shafts 111 bodily toward and away from the longitudinal center of the machine. The upper yoke arms 105 are slidably secured with respect to the transverse frame member 107 by bearings 188. The bearing blocks 183 for shafts 111 have flat faces and carry socket members 184 into which the inner ends of compression springs 185 extend. Compression springs 185 are supported at their outer ends by outer sockets 186. The lower horizontal arms 105 of yokes 106 are slidably secured with respect to the transverse frame member 110 by bearings 187, 190. Accordingly the rear feed roll shafts 111 are maintained in vertical position and have capacity to slide toward and away from one another. Thus the rear feed rolls 25 are spring-urged toward the body of the shrimp S with capacity yieldably to engage shrimp of different sizes.

The rear feed roll shafts 111 are driven from the master drive shaft 78 by sprockets 190, drive chains 191, and sprockets 192 fixed on each of the rear feed roll shafts 111. Also fixed on each of the shafts 111 are sprockets 193 which drive the connecting chains 194 meshed with driven sprockets 195 on the de-sheller shafts 104. De-sheller shafts 104 carry drive sprockets 196 each of which drives a connecting chain 197 meshed with a driven sprocket 200 fixed on each forward feed roll shaft 101. The feed and de-sheller rolls are thereby rotated continuously in the same direction at positively controlled speeds relative to one another.

One of the forward feed roll shafts 101 also carries a drive sprocket 201 which engages the chain 34 through which the conveyor belt 30 is positively driven in definite predetermined timed relation to the movement of the master drive shaft 78 and the cam shaft 71 which is driven therefrom. Accordingly the operations of the transverse tailsaws 22, feed rolls 23, de-sheller wheels 24, rear feed rolls 25, de-veiner saw 26 and de-legger element 27 are all synchronized with the positions of the sharp pins 44 on the main conveyor belt 30. This is of importance since the precise position of each shrimp S is predetermined initially by placing each shrimp S in a definite position on each sharp pin 44, preferably with the pin 44 projecting through the joint in the shrimp between the specific shell portions A and T, in longitudinal alignment with the muscles M. The actuation of each shrimp processing element of the machine is synchronized with respect to this portion of the shrimp body, thereby assuring a precise operation for processing shrimp bodies of different sizes.

One or more sterilizer lamps (not shown) are preferably mounted on the machine frame or elsewhere, in order to minimize spoilage during the shrimp processing operation.

Figure 12:
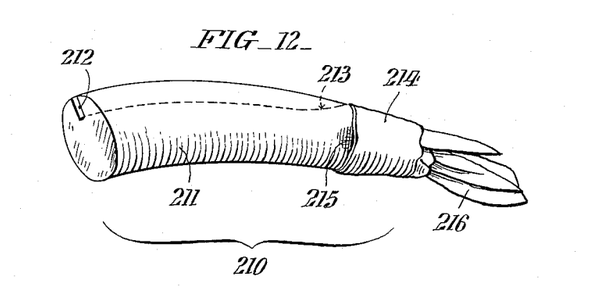
Fig. 12 represents a view in perspective of a shrimp constituting a product of the apparatus shown in the foregoing figures.

In the operation of the machine, shrimp de-shelling and cleaning operations of different character are afforded. If desired, the shrimp may be completely de-shelled from end to end or, on the other hand, a so-called fantail shrimp as illustrated in Fig. 12 may be produced. In either event it may be assumed that the shrimp are decapitated prior to the processing operation.

To prepare a completely cleaned, de-legged and de-shelled shrimp product, the de-veiner cam 136, tailsaw cam 70 and de-sheller cam 180 are adjusted along the cam shaft 71 to bring the inactive cam elements 136a, 70a, 180a into contact with the cam follower rollers 135, 66 and 177, respectively. Said cams are thereby rendered inactive. The motor 32 is energized and successive shrimp bodies S are placed (legs down) on the conveyor belt 30 by the operator of the machine, each pin 44 penetrating into the shrimp at any desired position along the shrimp body, preferably substantially as indicated in the annexed drawings. Each shrimp S is advanced by the belt 30 and positively engaged by the teeth 100 on forward feed rolls 23. The transverse tailsaws 22 are maintained withdrawn or in an inactive position, by the cam element 70a. De-veiner saw 26 revolves in contact with the top portion of the shrimp and cuts the shell longitudinally thereof. It also cuts away a longitudinal channel below said shell, thereby removing the upper vein from the shrimp as it moves rearwardly. This channel is cut substantially throughout the entire length of each shrimp body, including the shell section T. The de-legger element 27 concurrently revolves against the bottom of the shrimp and removes the legs and the bottom vein, as the shrimp moves rearwardly. Concurrently with the foregoing, as the shrimp advances into the machine the de-sheller hooks 162 engage the opposite sides of the shell (which have previously been cut away from one another by the de-veiner saw 26 and de-legger element 27), and said hooks 162 pull the shells through an arc outwardly away from the shrimp body. The shells are ultimately deposited in the shells collection bin 29. Each de-shelled shrimp body is engaged by the rear feed rolls 25, propelled rearwardly through the machine and ultimately dropped into the shrimp storage bin 28.

To prepare fantail shrimp of the character illustrated in Fig. 12 of the drawings, the de-veiner cam 136, tailsaw cam 70 and de-sheller cam 180 are adjusted along the camshaft 71 to bring the active cam elements 136b, 70b, 180b into contact with the cam follower rollers 135, 66 and 177, respectively. Said cams are thereby rendered active. The shrimp S are fed by the operator substantially as previously described, but care is now taken to align each pin 44 accurately with the joint between the shells T and A when placing each shrimp S on the main conveyor belt 30. The movement of said joint is thereby synchronized with the movement of tailsaws 22 which swing inwardly from their original retracted positions, cut the muscles M, and immediately return to their retracted positions. The swinging movement of the tailsaws 22 is actuated by the cam indentation 70c as the shrimp S is continuously advanced through the machine.

The de-veiner saw which cuts a channel in the top of the shrimp S is suddenly withdrawn upwardly to an inoperative position when it reaches the joint between the shell sections A and T. This movement is actuated by the de-veiner cam 136 as the shrimp advances continuously through the machine, and leaves the shell section T and the tail of the shrimp intact.

The de-sheller wheels 24 are suddenly withdrawn outwardly of the shrimp S to inoperative positions as the joint between the shell sections A and T reaches the hooks 162. This movement is actuated by the de-sheller cam 180 concurrently with the continuous advancement of the shrimp through the machine. The shell section T and the tail of the shrimp are thereby left intact.

The edible manufactured shrimp segment or product 210 comprises a body portion of clean, fresh edible shrimp meat 211 which has a longitudinal channel 212, as indicated in Fig. 12, the bottom of which channel 212 curves upwardly at 213 just in front of the tail shell section 214 which is attached to the rear end of the body portion 211. The body shells of the shrimp have been removed together with the upper and lower veins and the legs of the shrimp. The body 211 and tail shell section 214 are notched on both sides at 215 due to the action of tail saws 22. Shrimp of this character, completely cleaned and with tail 216 attached, is particularly valuable and desirable commercially.

While we have shown and described one specific feed means comprising a continuous belt conveyor with spaced-apart pin means 44 thereon, it will be appreciated that other types of shrimp feed means may be substituted therefor and synchronized with the other elements of the apparatus substantially as described herein. For example, feed means of the general character disclosed in our aforementioned copending application which bears Serial No. 224,712 may be utilized in accordance with this invention.

While we have shown a de-veiner saw 26 which includes a plurality of uniformly-spaced teeth or blades 142, the arrangement of teeth or blades may be modified within the scope of this invention. For example, the de-veiner saw may have spaced gaps between the teeth or blades, or between spaced groups of teeth or blades, wherein portions of the periphery of the de-veiner saw are of arcuate or curved form rather than blade form.

It is also within the scope of this invention to provide a scavenger element disposed rearwardly of the de-veiner saw 26 and the nozzle 151, to effect the removal of any residual material that may be found in the longitudinal channel at the top of the shrimp body. Such scavenger element may be in the form of a brush or blade and may be stationary or rotated mechanically.

It will further be appreciated that the de-legger element 27 shown in the drawings may be modified by providing three or more rows of spikes staggered with respect to one another around the periphery of the de-legger wheel, and that the scraper blade 160 may be modified as to size and shape for disposition between the individual rows of spikes. Preferably the stripping action of scraper blade 160 is supplemented by a stream of fluid directed against the periphery of the de-legger element 27. Such stream of fluid may be provided by the nozzle 151 or another fluid source, not shown.

While the operation of the apparatus has been described in connection with the production of either fan-tail shrimp or completely de-shelled shrimp, it will be understood that the apparatus may also readily be adjusted to produce cleaned shrimp with the body and tail shells remaining thereon. The linkage on which the de-sheller elements are mounted may readily be wired or otherwise secured so as to lock the de-sheller elements in an inoperative position wherein they do not contact the shrimp at any time. The cams which operate the tailsaws and the de-veiner saw are inactivated, and each shrimp is accordingly completely cleaned from end to end by the de-veiner and de-legger elements without having the shell removed therefrom.

Cleaned shrimp with the body and tail shells remaining thereon may also be produced by removing the de-sheller wheels 24 from their shafts 104 and substituting in their place a pair of rolls substantially identical to the forward feed rolls 23. Since the pins carried by the substitute rolls travel at substantially the same peripheral speed as the pins on the forward feed rolls 23 they merely penetrate through the shrimp shells without removing them from the shrimp body.

While we have described our invention with reference to one embodiment thereof, it will be apparent to those skilled in the art that various changes other than those referred to above may be made in the form of the device, that equivalent elements may be substituted for those specifically illustrated in the drawings, and that certain features of the invention may be used to advantage independently of the use of other features, all within the spirit and scope of the invention as defined in the appended claims.

Having thus described our invention, we claim:

1. Apparatus for removing a part of a shrimp body from a shrimp, comprising conveyor means for said shrimp, remover means above said conveyor means disposed adjacent to the path of conveyance of said shrimp, means for activating said remover means, said remover means being effective when activated to remove said part from said shrimp, control means for inactivating said remover means, and synchronizing means operatively connected to both said conveyor means and said control means, said synchronizing means causing said control means to actuate said remover means in predetermined timed relation to the movement of said shrimp on said conveyor means.

2. Shrimp processing apparatus comprising continuous feed means for said shrimp, drive means connected to said feed means for operating said feed means, spaced-apart de-sheller elements disposed above and adjacent to said feed means, on opposite sides of said feed means, shell-engaging means on said de-sheller elements, yieldable means connected to said de-sheller elements continuously urging said de-sheller elements toward one another, and drive means connected to said de-sheller elements for moving said shell engaging means relative to said shrimp to thereby remove said shell from said shrimp.

3. Shrimp processing apparatus comprising feed means for moving said shrimp along a given path, cutter means located above said feed means adjacent said path, means including a support for the cutter-means located for contacting said shrimp with said cutter means as said shrimp moves along said path, said cutter means having capacity to cut a longitudinal slot in the shell of said shrimp, a pair of de-sheller wheels positioned on opposite sides of said cutter means adjacent said feed means, said de-sheller wheels having shell-engaging members located and arranged to contact said shell after said shell has been slotted by said cutter, and to remove said shell from said shrimp.

4. Shrimp cleaning apparatus comprising a continuous feed conveyor having a belt and a sharp pin extending upwardly from said belt, said sharp pin having capacity to penetrate into a shrimp mounted thereon, drive means positively connected to said conveyor, shrimp cleaning means located adjacent said conveyor, movable supporting means connected to carry said shrimp cleaning means, whereby said shrimp cleaning means is movable relative to said conveyor for engagement with and disengagement from said shrimp, control means connected to said supporting means for controlling the movement of said shrimp cleaning means, and connecting means positively connecting said drive means to said control means, whereby the movement of said sharp pin is synchronized with the movement of said shrimp cleaning means.

5. Shrimp cleaning apparatus comprising a support, shrimp feeding means on said support for moving said shrimp along a predetermined path, a shrimp de-veiner saw rotatably mounted above said feeding means adjacent said shrimp path, means for rotating said de-veiner saw, a de-legger wheel rotatably mounted below said shrimp path, and means for rotating said de-legger wheel, said de-legger wheel being positioned directly below said de-veiner saw.

6. The apparatus defined in claim 5, further characterized by the fact that means are provided for rotating the de-veiner saw in one direction and means are provided for rotating the de-legger wheel in the opposite direction.

7. Shrimp cleaning apparatus comprising feed means for moving said shrimp in a definite path, shrimp cleaning means movable toward and away from said feed means and said path to assume working and inoperative positions relative to said shrimp, supporting means for said cleaning means, said supporting means normally urging said cleaning means toward its working position wherein said cleaning means contacts the shrimp, and cam means operatively connected to actuate said supporting means, said cam means having an active cam element effective to actuate such movement of said cleaning means in a definite, predetermined sequence.

8. In a shrimp processing apparatus, the combination comprising a shrimp feed conveyor having a discharge end, a pair of feed rolls at the discharge end of said conveyor, said feed rolls being positioned at opposite sides of said conveyor to engage opposite sides of said shrimp as it is discharged from said conveyor, pins on the feed rolls, said pins having capacity to pierce the shells of said shrimp and positively engage said shrimp thereon, means for revolving said feed rolls and thereby advancing said shrimp therebetween, mounting means for said feed rolls, said mounting means including linkages connected to said feed rolls permitting their movement toward and away from one another, said linkages being interconnected and thereby serving to equalize said movements of said feed rolls, and yieldable means effective upon both said linkages and continuously urging said feed rolls toward one another.

9. In apparatus for manufacturing fantail shrimp from natural shrimp having body shells, a tail shell and muscles at the side of said shrimp joining said tail shell to the adjacent body shell, the combination comprising feed means for said shrimp, cutter means adjacent said feed means for severing said muscles at the sides of said shrimp, de-veiner means above said feed means for removing the upper vein from said shrimp, de-sheller means adjacent said feed means for removing the body shells from said shrimp, said body shells being forward of the muscles severed by said cutter means, separate cam means for activating said cutter means, de-veiner means and de-sheller means, and synchronizing means connecting said separate cam means together for operation of said cutter, de-veiner, and de-sheller means in predetermined timed relation relative to one another.

10. Shrimp-deshelling apparatus comprising a support, shrimp feed means carried by said support, opposed bracket members pivoted on said support, opposed rotatable shafts carried by said bracket members, de-sheller means carried by each of said rotatable shafts and located adjacent to said shrimp feed means, said de-sheller means being movable toward and away from one another when said bracket members move about their pivots, spring means continuously urging said de-sheller means toward one another to engage opposite sides of the shrimp carried by said shrimp feed means, said bracket members having transverse slots therein, opposed feeder roller shafts extending through said slots, feeder rolls on said feeder roll shafts, said feeder rolls being adjacent to said de-sheller means with capacity to receive and engage the shrimp therefrom, and spring means yieldably urging said feeder rolls toward one another independently of the movement of said de-sheller means.

References Cited in the file of this patent

UNITED STATES PATENTS

| Number | Name | Date |
|---|---|---|
| 241,357 | Haskins | May 10, 1881 |
| 2,034,691 | Bottker et al. | Mar. 24, 1936 |
| 2,263,694 | Grayson | Nov. 25, 1941 |
| 2,263,697 | Grayson | Nov. 25, 1941 |
| 2,299,774 | Weems | Oct. 27, 1942 |
| 2,301,729 | Krull | Nov. 10, 1942 |
| 2,397,547 | Hempel | Apr. 2, 1946 |
| 2,555,232 | Guice et al. | May 29, 1951 |
| 2,594,205 | Paoli | Apr. 22, 1952 |
| 2,600,627 | Envoldsen | June 17, 1952 |
| 2,625,705 | Avetta et al. | Jan. 20, 1953 |
| 2,637,064 | Miller | May 5, 1953 |
| 2,644,980 | McKinstry | July 14, 1953 |